United States Patent
Powell

(10) Patent No.: US 6,253,476 B1
(45) Date of Patent: Jul. 3, 2001

(54) DISPLAY PLATE ATTACHABLE TO A REAR OF AN AUTOMOBILE

(76) Inventor: Jon R. Powell, 3809 Fuchsia La., Modesto, CA (US) 95356

(*) Notice: Subject to any disclaimer, the term of this patent is extended or adjusted under 35 U.S.C. 154(b) by 0 days.

(21) Appl. No.: 09/160,465

(22) Filed: Sep. 24, 1998

(51) Int. Cl.[7] .................................................. G09F 21/04
(52) U.S. Cl. .............................................. 40/591; 280/507
(58) Field of Search ......................... 40/591, 595, 200; 280/507, 727; 224/511, 488; 248/225.11, 300; D12/162, 172

(56) References Cited

U.S. PATENT DOCUMENTS

| | | |
|---|---|---|
| D. 189,713 | 2/1961 | Brandt ................................ 40/591 X |
| D. 388,384 * | 12/1997 | Williams ............................ D12/162 |
| 1,360,880 * | 11/1920 | Buchholtz ............................ 40/200 |
| 1,408,032 * | 2/1922 | Reiser et al. ........................ 40/201 |
| 1,629,060 * | 5/1927 | Wolfson ................................ 40/201 |
| 2,496,763 | 2/1950 | Whaley ................................ 40/591 |
| 3,271,050 * | 9/1966 | Saunders . |
| 3,509,653 | 5/1970 | Hummel .............................. 40/591 |
| 3,782,761 | 1/1974 | Cardin, Sr. . |
| 3,959,906 * | 6/1976 | Norris, Jr. et al. ................. 40/595 |
| 4,216,936 * | 8/1980 | DeSelms . |
| 4,736,539 | 4/1988 | Dickinson .......................... 40/591 |
| 4,955,153 | 9/1990 | Albrecht et al. ................... 40/661 |
| 5,092,503 | 3/1992 | Cocks . |
| 5,603,178 | 2/1997 | Morrison ............................ 40/591 |
| 5,620,198 * | 4/1997 | Borchers ............................ 280/507 |
| 5,647,621 * | 7/1997 | McClellan ...................... 280/507 X |
| 5,752,636 * | 5/1998 | Manley .......................... 224/511 X |
| 6,006,459 * | 12/1999 | Kosmach ............................ 40/200 |

FOREIGN PATENT DOCUMENTS

| | | | |
|---|---|---|---|
| 382414 * | 10/1932 | (GB) | ............................ 40/200 |

* cited by examiner

Primary Examiner—Joanne Silbermann
(74) Attorney, Agent, or Firm—Heisler & Associates

(57) ABSTRACT

A display plate kit 10 is provided which allows a message display plate 20 to be attached to the rear bumper B of a vehicle V in various modes without the use of adhesives. In a first mode, the plate 20 may be attached to a tow ball T on a vehicle V by means of a top tab 30 having a slot 35 to receive a post P of the tow ball T which is threadably secured to a tow ball nut N. In a second mode, the plate 20 may be attached by means of bottom tabs 40 with holes 45 whose spacing corresponds to those of a standard license plate L so that the same screws 47 used to attach the license plate L to the vehicle V may be used to secure the display plate 20 to the front or rear bumper B of the vehicle V. In a third mode, the display plate 20 may be attached to a receiver R extending from a vehicle V by means of a tube 60 which is attachable to a front surface 24 of the display plate 20 and slidably mates with the receiver R. The kit 10 of the present invention includes lettering having a variety of font styles and colors to allows various messages to be adhesively attached to surfaces 22, 24 of the display plate 20.

10 Claims, 3 Drawing Sheets

DISPLAY PLATE ATTACHABLE TO A REAR OF AN AUTOMOBILE

FIELD OF THE INVENTION

The present invention relates to display plates for vehicles. More particularly, this invention relates to display plates for vehicles which may be removably installed adjacent the rear bumper.

BACKGROUND OF THE INVENTION

Messages are frequently displayed on moving vehicles by applying rectangular strips of paper with printed messages to the rear vehicle bumpers, using an adhesive. These message display sheets are commonly known as "bumper stickers." Bumper stickers are difficult to remove and frequently leave unsightly patches of adhesive on the exterior finish of a vehicle after removal.

A general trend toward maintaining a cleaner and less cluttered vehicle appearance, especially on newer cars, has reduced the use of bumper stickers in favor of other removable display devices. The prior art describes display plates which are attached to the vehicle trunk lid or rear bumper by means of an adjustable hook clip (Brandt, U.S. Pat. No. D189,713; Hummel, U.S. Pat. No. 3,509,653). Other prior art describes display signs which are adhesively attached to the inside surface of a vehicle window (Albrecht, U.S. Pat. No. 4,955,153). Still other prior art describes a bumper sticker holder, including a base plate and peripheral frame, which is threadably attached to the bumper of a vehicle (Dickinson, U.S. Pat. No. 4,736,539). Additionally, Morrison (U.S. Pat. No. 5,603,178) describes an ornamental cover for tubular trailer hitch sockets, also known as receivers, where the primary purpose of the cover is to conceal the undecorated opening of the trailer hitch socket while not in use. Morrison's cover is releasably attached to the trailer hitch socket by a threaded ear. A rectangular plate with printed text or graphics is joined to the end of the ear. Morrison's cover may only be used with tubular trailer hitch sockets.

Generally, vehicle display systems described in the prior art are suited to only one primary method of attachment. Automobiles vary widely in rear end configuration, such that no one system of attachment can be universally effective. Accordingly, a need exists for a vehicle message display plate which can be easily installed and removed, will fit a variety of vehicle types, and has multiple modes of installation and attachment.

SUMMARY OF THE INVENTION

The present invention is a kit for mounting a versatile message display plate adjacent the rear bumper of a vehicle without using adhesives or other permanent mounting means. The display plate of the present invention includes multiple attachment elements which allow the plate to be deployed in a variety of modes.

In a first mounting mode, the message display plate is secured to a vehicle ball-type trailer hitch or bumper by means of a top tab which extends laterally from the front surface of the display plate. In this first mode, a threaded post of the trailer hitch tow ball is passed through a hole in the tab. The tow ball post is then threadably secured in a hole in the trailer hitch tongue or vehicle bumper using a tow ball nut.

In a second mounting mode, the display plate may be secured to the top or bottom of a standard vehicle license plate attachment point by means of two bottom tabs with holes whose spacing corresponds to those of a standard license plate. The display plate may be mounted with the same screws used to secure the license plate. The display plate can be oriented such that it is located directly above or directly below the vehicle license plate. When the vehicle is not registered or otherwise the law allows, the display plate can be located covering the vehicle license plate. The tab may be lightly scored to allow precise removal from the edge of the display plate to accommodate other mounting modes.

In a third mounting mode, the display plate of the present invention may be mounted in a square receiver socket of a vehicle trailer hitch. A separate tubular element is provided which may be mounted to the front surface of the display plate using an appropriate adhesive. The tubular element has a square cross-section to match the interior shape of the receiver socket. The tubular element is attached to extend perpendicularly from the front of the display plate of the present invention to slidably mate with the receiver. Corresponding bore holes within both the tubular element and the receiver are aligned to accept a cylindrical pin to securely mate the display plate with the trailer hitch.

The kit of the present invention also includes a variety of letters and numerals of differing colors and font styles which may be adhesively attached to the rear surface of the display plate to spell an identifiable message. Alternatively, the rear surface can have standard sayings or other decorative material pre-printed thereon.

OBJECTS OF THE INVENTION

A primary object of the present invention is to provide a vehicle message display plate which may be easily installed and removed in a variety of mounting modes on a variety of vehicles without the use of adhesives.

Another object of the present invention is to provide a vehicle message display plate which includes multiple attachment elements that can be removed from the base structure of the plate when not needed or added when needed.

Another object of the present invention is to provide a vehicle message display plate whose message may be quickly and easily modified.

Another object of the present invention is to provide a vehicle message display plate whose lettering design and color may be easily modified.

Another object of the present invention is to provide a vehicle message display plate to cover a generally unattractive open end of a tubular trailer hitch socket as well as the spare tire and rear differential.

Another object of the present invention is to provide a vehicle message display plate that can be installed to the existing license plate of a vehicle.

Another object of the present invention is to provide a vehicle message display plate constructed of rigid polycarbonate material able to withstand the deleterious effects of the sun's rays and other forms of weathering.

Another objective of the present invention is to provide a cover for a tubular trailer hitch socket which prevents unwanted entry of dirt into the socket.

Another object of the present invention is to provide a vehicle message display plate of simple and reliable manufacture made of readily available material.

Other further objects of the present invention will become apparent from a careful reading of the included drawing figures, the claims and detailed description of the invention.

DESCRIPTION OF THE PREFERRED EMBODIMENT

Figure 1:
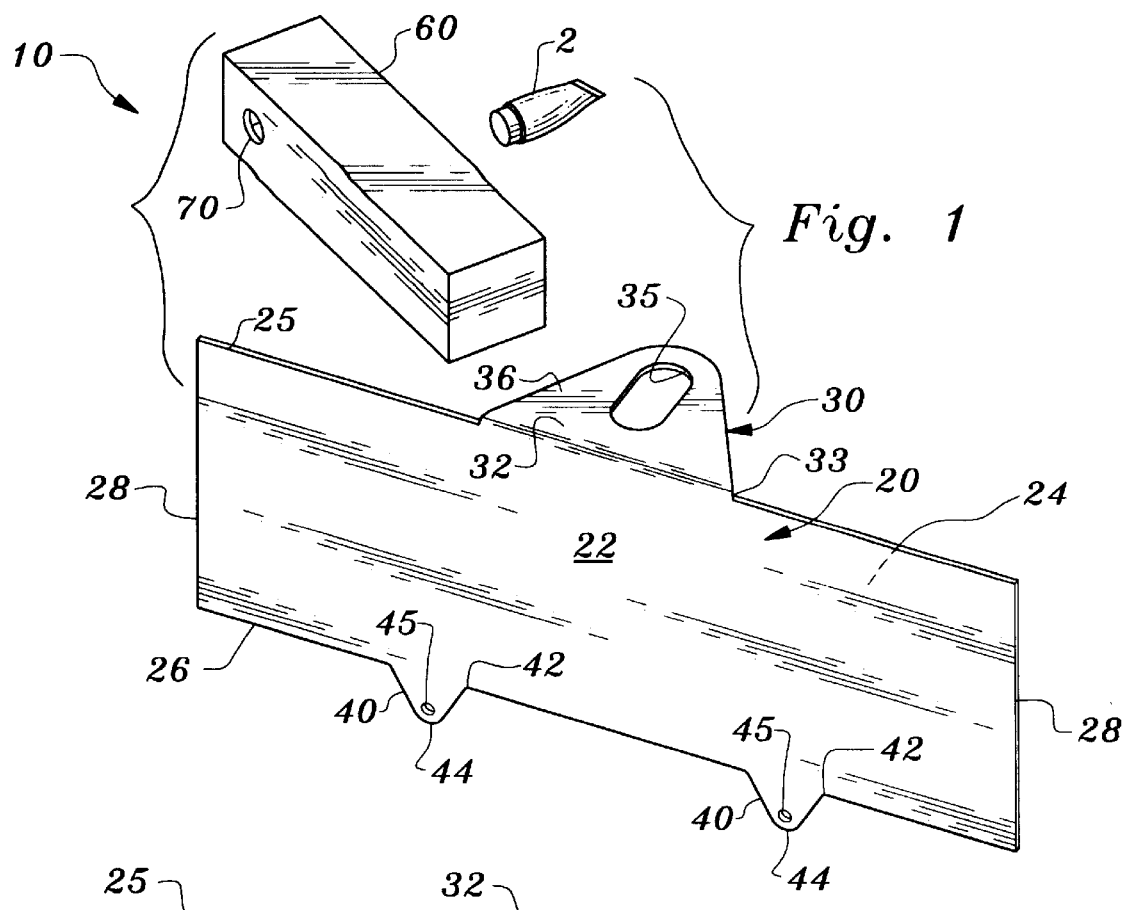
FIG. 1 is a front perspective view of the various different parts of the display plate kit of the present invention.

Referring to the drawings, wherein like reference numerals represent like parts throughout the various drawing figures, reference numeral 10 (FIG. 1) is directed to a kit for releasably attaching a message display plate 20 to the rear of a vehicle V. The kit 10 allows a display plate 20 to be mounted to a vehicle V bumper B without using adhesives to join the plate 20 to the bumper B.

In essence, and with initial reference to FIG. 1, the kit 10 of the present invention includes a generally rectangular plate 20 which provides both a rear surface 22 to display a message and a foundation to support various elements for attaching the plate 20 adjacent a bumper B of the vehicle V. One attachment element, a top tab 30, extends perpendicularly from a top edge 25 of the plate 20. Further attachment elements, two bottom tabs 40, extend from a bottom edge 26 of the plate 20. Lettering may be adhesively attached to a rear surface 22 of the plate 20 to display an identifiable message. A third attachment element, a separate tube 60, may be adhesively attached to a front surface 24 of the plate 20 for mating with a receiver R on the bumper B of a vehicle V. The tube 60 may be attached using an adhesive 2 suited to joining plastic materials.

Figure 2:
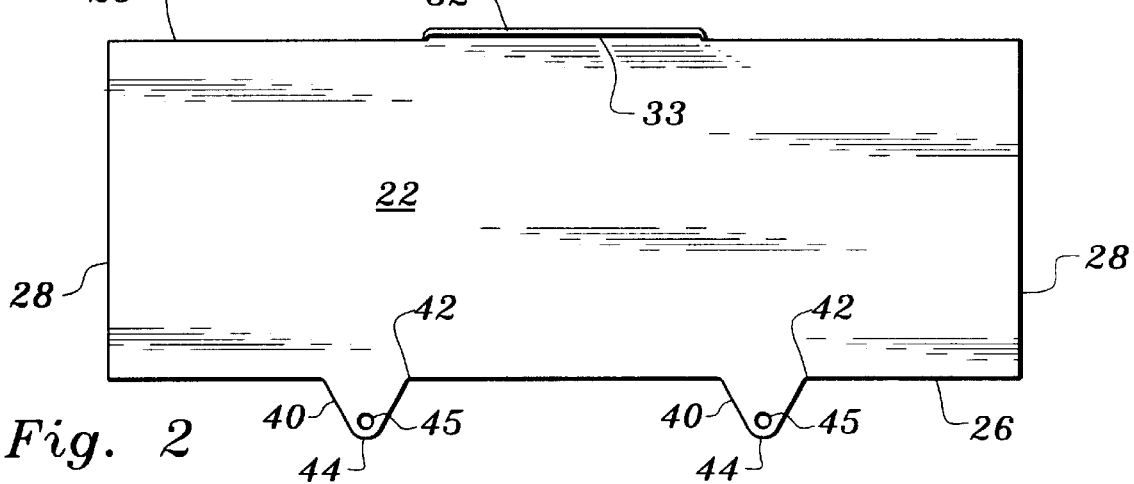
FIG. 2 is a rear elevation view of the display plate of the present invention.
Figure 3:
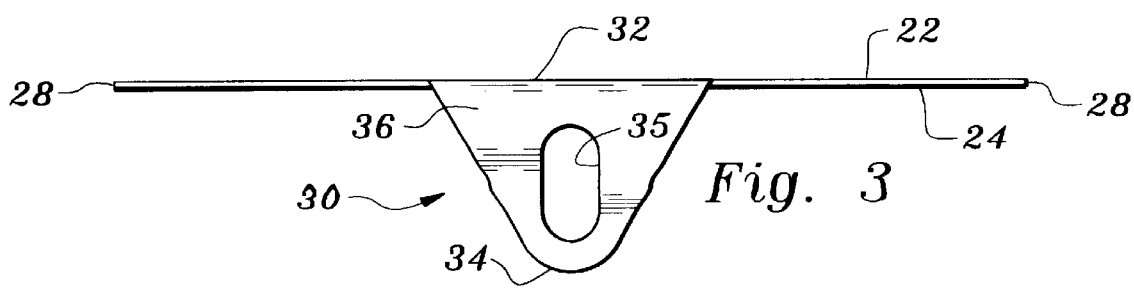
FIG. 3 is a top plan view of the display plate of the present invention.

More specifically, and with particular initial reference to FIGS. 1–3, the details of the kit 10 of the present invention are described. The kit 10 includes a message display plate 20. The plate 20 is preferably rectangular, having dimensions similar to those of a standard license plate L where the plate width is greater than its height. The plate 2C includes a rear planar surface 22 opposite an opposing and parallel front planar surface 24 (FIG. 3). An elongate top edge 25 extends between the rear surface 22 and front surface 24 of the plate 20. An opposing parallel bottom edge 26 of the plate 20 extends between the rear surface 22 and the front surface 24. The plate 20 includes two side edges 28 at either end which extend between the rear surface 22 and the front surface 24 to join the top edge 25 with the bottom edge 26.

The plate 20 and other elements of the kit 10 are preferably made of polycarbonate plastic. Such a material provides greater resistance to strength degradation caused by exposure to solar radiation than other hydrocarbon polymers and yet can still be relatively easily formed using known plastic forming techniques.

Figure 4:
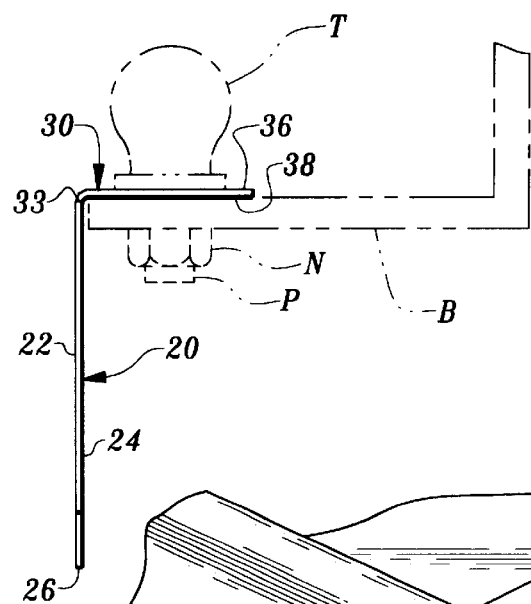
FIG. 4 is a side elevation view of the display plate of the present invention installed on a vehicle bumper by the top tab and using the tow ball assembly to hold the plate in place.

A top tab 30 preferably extends perpendicularly from an approximate midpoint of the top edge 25 of the plate 20 in a forward direction from the front surface 24 of the plate 20 (FIG. 1). The top tab 30 includes a rear edge 32 which is joined along the top edge 25 of the plate 20. The union of the rear edge 32 of the top tab 30 with the top edge 25 of the plate 20 forms a bend 33. The top tab 30 extends forward from the front surface 24 of the plate 20 and terminates in the shape of a forward curve 34 (FIG. 3). The forward curve 34 defines the perimeter of a planar top surface 36 of the tab 30 and an opposing parallel planar bottom surface 38 of the top tab 30 (FIG. 4).

Figure 5:
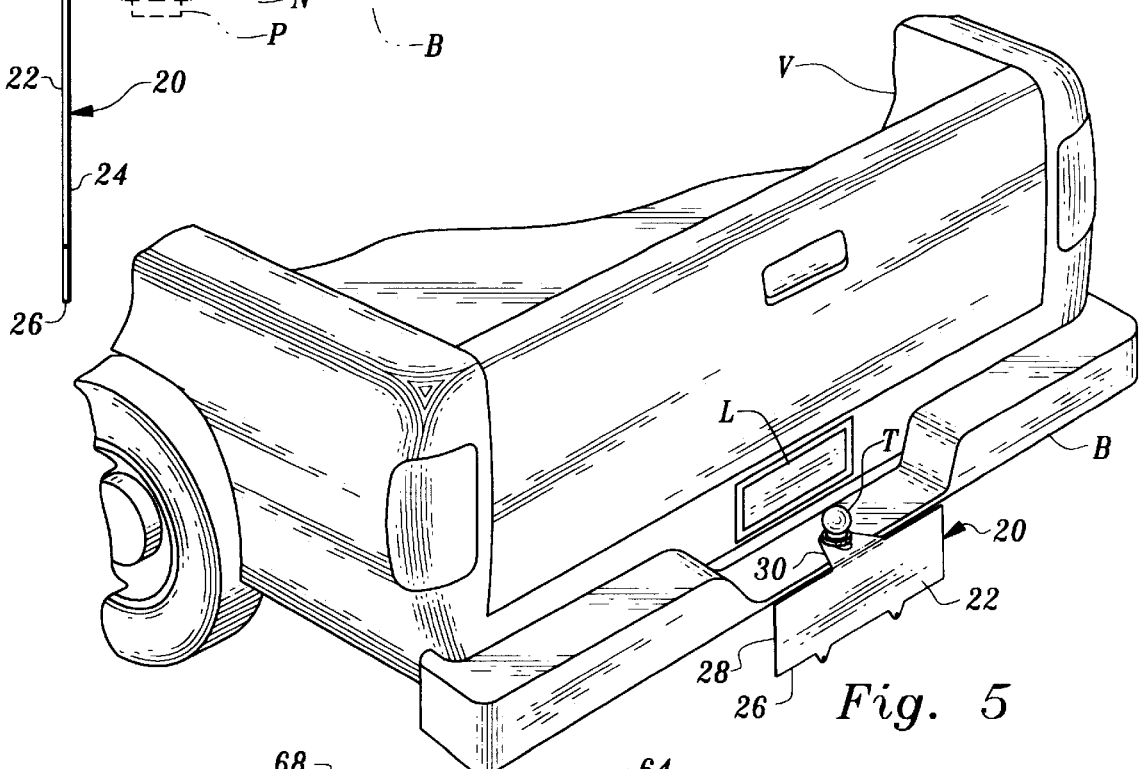
FIG. 5 is a perspective view of the display plate of the present invention installed on a vehicle rear bumper using the tow ball and top tab.
Figure 6:
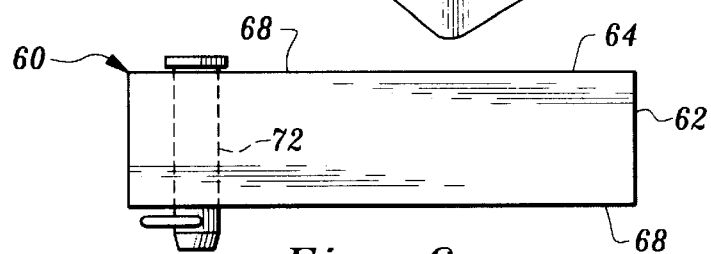
FIG. 6 is a top plan view of the tube of the present invention including a pin to hold the tube within a receiver and before the tube is adhesively attached to the front surface of the display plate.

The top and bottom surfaces 36, 38 of the top tab 30 are penetrated by a slot 35 sized to receive a post P of a typical tow ball T, but smaller than the size of the tow ball T. The slot 35 has length in a forward direction which is greater than its width. When the tab 30 is used to attach the display plate 20 to the rear bumper B of a vehicle V (FIG. 5), the elongate slot 35 allows the plate 20 to be adjusted forward or backward to accommodate bumpers B of varying sizes and configurations.

Figure 10:
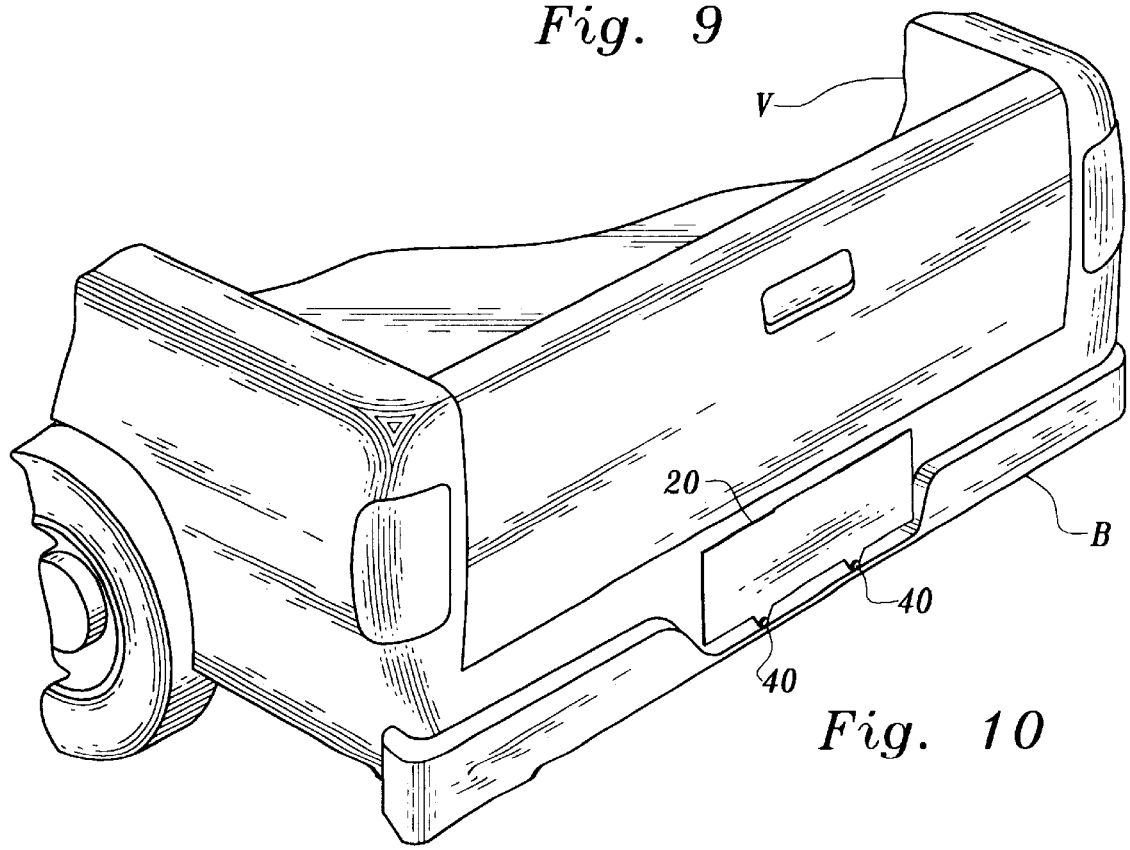
FIG. 10 is a perspective view of the display plate of the present invention installed adjacent a vehicle rear bumper using screws which secure the plate to the location typically used for attaching a standard license plate.

Two bottom tabs 40 extend downward from the bottom edge 26 of the plate 20 (FIGS. 1 and 2). The bottom tabs have upper edges 42 which are joined to the bottom edge 26 of the plate 20. Each bottom tab 40 extends down to a lower curve 44. The lower curve 44 defines the perimeter of the bottom tab 40. Each bottom tab 40 is penetrated by a circular hole 45. The circular hole 45 has a diameter of approximately three-sixteenths of an inch to slidably accept a screw of the size commonly used to attach standard vehicle license plates L to the bumper B of a vehicle V. The bottom tabs 40 are evenly spaced along the bottom edge 26 of the plate 20 so that the holes 45 align with the threaded holes in a standard license plate mounting fixture. Hence, the same screws used to secure the license plate L to the vehicle V may be used to mount the plate 20 to the vehicle V via the bottom tabs 40 (FIG. 10). Typically, the tabs 40 will be spaced seven inches apart to correspond to the spacing of the holes in a common license plate L. While shown adjacent the rear bumper B of the vehicle V, the bottom tabs 40 could be used to attach the display plate 20 to the front bumper B also.

Individual lettering is provided with the kit 10. The lettering may be adhesively attached to the rear surface 22 of the plate 20 to spell out an identifiable message. The lettering is provided in a plurality of sizes, font types, style, colors and reflectivity to provide variability in the displayed message appearance.

Figure 7:
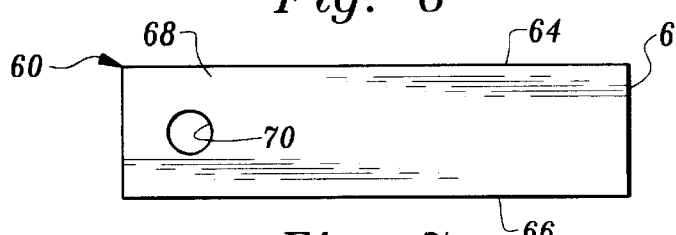
FIG. 7 is a side elevation view of that which is shown in FIG. 6, without the pin.
Figure 8:
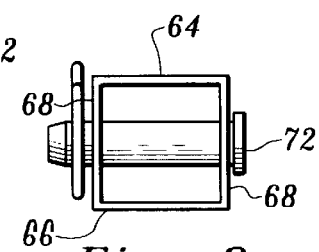
FIG. 8 is an end view of that which is shown in FIG. 6.
Figure 9:
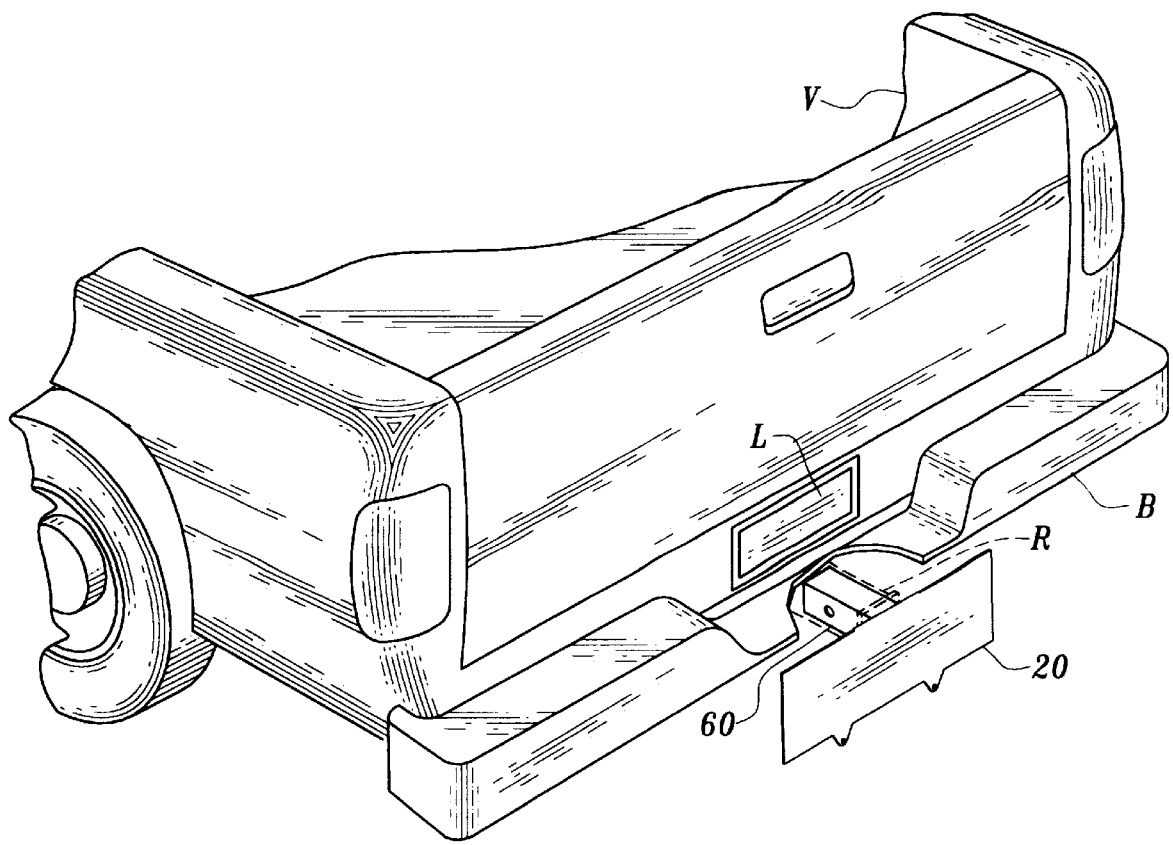
FIG. 9 is a perspective view of the display plate of the present invention mounted adjacent a vehicle rear bumper using the tube to releasably mate with the receiver.

As most clearly shown in FIGS. 6–9, a separate tubular element 60 is provided which may be attached with an adhesive 2 (FIG. 1) along a rear face 62 to extend forward from the front surface 24 of the plate 20. The tube 60 has a generally square cross-section (FIG. 8) to match the interior shape of a receiver R of a socket-type trailer hitch (FIG. 9). The tube 60 is sized to slidably telescope within the receiver R. The tube 60 includes a substantially rectangular top wall 64 opposite a substantially equivalent and parallel bottom wall 66 (FIG. 7). Two side walls 68 extend perpendicularly between and join the top and bottom walls 64, 66 to form the tube 60. The side walls 68 are penetrated by bores 70 (FIG. 7) which correspond with holes in the receiver R. The bores 70 in the tube 60 are spaced a distance from the rear face 62 of the tube 60 approximately equal to the spacing of the holes from a rear end of the receiver R. The tube 60 is releasably secured to the receiver R by a pin 72 (FIGS. 6 and 8) which simultaneously passes through the bores 70 in the tube 60 and the holes in the receiver R (FIG. 9).

In use and operation, the kit 10 provides various modes by which the plate 20 may be mounted adjacent the rear bumper B of a vehicle V. In a first mode (FIG. 5), the plate 20 may be mounted adjacent the bumper B of the vehicle V by means of the top tab 30. Where the vehicle V includes a tow ball T, the tow ball T is first removed from the bumper B. A post P of the tow ball T is then passed through the slot 35 in the tab 30. The tow ball T is then reattached to the bumper B of the vehicle V using a tow ball nut N which threads onto the post P of the tow ball T (FIG. 4). The top tab 30 is sandwiched between the upper surface of the bumper B of the vehicle V and the lower surface of the tow ball T (FIG. 4). In this mounting mode, the plate 20 may be oriented to extend downward (FIG. 5) or upward from point of attachment of the top tab 30.

In a second mounting mode (FIG. 10), the plate 20 may be mounted using the bottom tabs 40. The bottom tabs 40 and their holes 45 are spaced to correspond to typical spacing of holes in a common license plate L. Screws are passed through the holes 45 in the bottom tabs 40 and threaded into the holes in a typical license plate L mounting fixture on the vehicle V to secure the plate 20 adjacent the bumper B (FIG. 10). In this mode, the plate 20 may be attached to upper or lower holes in the license plate L fixture. Additionally, the plate 20 may be attached over the existing license plate L space in place of the license plate L, or to overlie the license plate L when the vehicle is unregistered or otherwise can legally have the license plate L covered (FIG. 10). Further, the plate 20 may be positioned to extend up or down from the upper or lower holes in the license plate L fixture, depending on the size and configuration of the bumper B of the vehicle V.

Still further, the plate 20 may be installed upside down with the top tab 30 on bottom pointing forward, which eliminates the need to remove the top tab 30 from the plate 20. The lettering would still be placed on the rear surface 22. However, in some cases the top tab 30 may be removed from the plate 20 by bending the top tab 30 along a scored portion in the bend 33 formed by the union of the top tab 30 with the top edge 25 of the plate 20.

In a third mounting mode (FIG. 9), the plate 20 may be mounted adjacent the rear bumper B of a vehicle V using the tube 60 provided in the kit 10 (FIG. 1). This mounting mode presupposes attachment to the bumper B of a vehicle V which includes a receiver R designed to hold a removable tow ball (FIG. 9). Before mounting in this mode, the rear face 62 of the tube 60 is adhesively attached to the front surface 24 of the plate 20 using adhesive 2 (FIG. 1). The tube 60 is preferably joined at a center point of the front surface 25 to extend perpendicularly from the front surface 25 (FIG. 9). Depending on the particular configuration of the bumper B of the vehicle V, the top tab 30 may or may not need to be removed. The tube 60 is slid into the interior of the receiver R so that the bores 70 in the sidewalls 68 of the tube 60 align with corresponding holes in the receiver R (FIG. 9). A pin 72 (FIGS. 6 and 8) is then passed through the bore 60 and holes to securely engage the plate 20 with the receiver R.

Individual lettering provided in the kit 10 may be adhesively applied to either the front surface 24 or rear surface 22 of the plate 20 to spell out an identifiable message. The preferred surface 22, 24 will depend upon the mounting orientation of the plate 20. The adhesive may either be applied to the lettering, or, the lettering may come with pre-applied adhesive. Also, bumper stickers can be attached to the rear surface 22 or the rear surface 22 can be pre-printed with a desired logo or other message or design.

This disclosure is provided to reveal a preferred embodiment of the invention and a best mode for practicing the invention. Having thus described the invention in this way, it should be apparent that various different modifications can be made to the preferred embodiment without departing from the scope and fair meaning of this disclosure.

What is claimed is:

1. A display plate and tow ball combination for attachment to a structure on a front or rear of a vehicle, comprising in combination:

a tow ball attachable to the vehicle, said tow ball including a post having a width less than a width of portions of said tow ball above said post;

a display plate including a substantially planar rear surface parallel to and opposite a substantially planar front surface;

said display plate including a top edge extending between said rear surface and said front surface;

said display plate including a top tab extending forward from said top edge perpendicular to said front surface;

said top tab including an opening passing therethrough, said opening sized smaller than portions of said tow ball above said post, said opening sized larger than said post, such that said top tab can be attached to the vehicle by locating said opening around the post and below portions of the tow ball above said post; and wherein said plate includes a bottom edge extending between said rear surface and said front surface, said bottom edge including two bottom tabs extending from said bottom edge, each said bottom tab including a hole passing therethrough.

2. A display plate and tow ball combination for attachment to a structure on a front or rear of a vehicle, comprising in combination:

a tow ball attachable to the vehicle, said tow ball including a post having a width less than a width of portions of said tow ball above said post;

a display plate including a substantially planar rear surface parallel to and opposite a substantially planar front surface;

said display plate including a top edge extending between said rear surface and said front surface;

said display plate including a top tab extending forward from said top edge perpendicular to said front surface;

said top tab including an opening passing therethrough, said opening sized smaller than portions of said tow ball above said post, said opening sized larger than said post, such that said top tab can be attached to the vehicle by locating said opening around the post and below portions of the tow ball above said post; and wherein said tow ball is substantially spherical above said post with a diameter greater than a size of said opening in said top tab.

3. The display plate and tow ball combination of claim 2 wherein said opening in said top tab is a slot having a greater length extending forward from said top edge than a width perpendicular to said length, such that a position of said display plate relative to the vehicle can be adjusted in a forward or a rearward direction somewhat, said width of said slot less than said diameter of said tow ball above said post.

4. A display plate attachment kit and tow ball combination for attachment to a structure on a rear of a vehicle, comprising in combination:
- a tow ball attachable to a rear of the vehicle, said tow ball including a post having a width less than a width of portions of said tow ball above said post;
- a display plate including a substantially planar rear surface parallel to and opposite a substantially planar front surface;
- said display plate including a top edge extending between said rear surface and said front surface;
- said display plate including a top tab extending forward from said top edge perpendicular to said front surface;
- said top tab including an opening passing therethrough, said opening sized smaller than portions of said tow ball above said post, said opening sized larger than said post, such that said top tab can be attached to the vehicle by locating said opening around the post and below portions of the tow ball above said post;
- wherein said plate includes a bottom edge extending between said rear surface and said front surface, said bottom edge including two bottom tabs extending from said bottom edge, each said bottom tab including a hole passing therethrough;
- wherein a spacing between said holes passing through said two bottom tabs is approximately seven inches, such that spacing between said holes conforms to spacing provided by holes in many common vehicle license plates;
- wherein said opening in said top tab is a slot having a greater length extending forward from said top edge than a width perpendicular to said length, such that position of said display plate relative to the bumper can be adjusted in a forward or a rearward direction somewhat to accommodate bumpers of different sizes; and
- wherein said display plate includes a tube said tube having a substantially square cross-section matching an interior shape of a vehicle receiver extending from a rear of the vehicle, such that said tube can telescope into and out of said receiver.

5. The kit and combination of claim 4 wherein an adhesive is provided capable of attaching a rear face of said tube to said front surface of said plate with said tube extending substantially perpendicularly from said front surface.

6. The kit and combination of claim 5 wherein said tube includes bores passing horizontally therethrough at a location spaced from the rear face a distance similar to a distance that holes in the vehicle receiver are spaced from a rear end of the receiver, such that a pin can pass through the holes in the receiver and through said bores in said tube for securing said tube and said plate attached to said tube removably to the vehicle.

7. The kit and combination of claim 6 wherein said top tab attaches to said top edge through a bend, said bend scored such that said top tab can be precisely removed from other portions of said display plate.

8. The display plate of claim 7 wherein a plurality of letters are adhesively attached to said rear surface of said plate in a manner spelling an identifiable message.

9. A display plate attachable between a tow ball and a bumper to which the tow ball is coupled, comprising in combination:
- a substantially planar rear surface;
- a top tab extending forward from said display plate in an orientation non-parallel with said rear surface;
- a tow ball having a post attachable to the bumper with a width of said post less than a width of portions of said tow ball above said post;
- an opening passing through said top tab, said opening smaller than portions of said tow ball above said post and larger than said post of said tow ball; and
- wherein said opening in said top tab is configured as a slot having a length different from a width.

10. A display plate attachable between a tow ball and a bumper to which the tow ball is coupled, comprising in combination:
- a substantially planar rear surface;
- a top tab extending forward from said display plate in an orientation non-parallel with said rear surface;
- a tow ball having a post attachable to the bumper with a width of said post less than a width of portions of said tow ball above said post;
- an opening passing through said top tab, said opening smaller than portions of
- an opening passing through said top tab, said opening smaller than portions of said tow ball above said post and larger than said post of said tow ball; and
- wherein said tab has a tapering width as said top tab extends away from said display plate.

* * * * *